US006442326B1

(12) United States Patent
Kaneko

(10) Patent No.: US 6,442,326 B1
(45) Date of Patent: Aug. 27, 2002

(54) COMMERCIAL BROADCASTING SYSTEM

(75) Inventor: Shunji Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 816 days.

(21) Appl. No.: 08/716,061

(22) Filed: Sep. 19, 1996

(30) Foreign Application Priority Data

Sep. 20, 1995 (JP) ............................................. 7-266434

(51) Int. Cl.[7] .................................................. H04N 5/91

(52) U.S. Cl. ......................... 386/46; 348/907; 358/908; 725/32

(58) Field of Search .............................. 386/45, 46, 69, 386/70, 125, 126, 96; 348/722, 907; 358/908; 725/32, 36

(56) References Cited

U.S. PATENT DOCUMENTS 5,418,622 A * 5/1995 Takeuchi .................... 358/335

* cited by examiner

*Primary Examiner*—Andrew B. Christensen
*Assistant Examiner*—Christopher Onuaku
(74) *Attorney, Agent, or Firm*—Frommer Lawrence & Haug LLP; William S. Frommer; Joe H. Shallenburger

(57) ABSTRACT

A commercial sending system that can easily record a non-recorded commercial material is provided. When a play list is input from a creating block or a receiving block, a CM material DB managing block is asked whether or not CM materials included in the list have been recorded in the system. If a non-recorded CM material is included in the list, the non-recorded CM material is displayed on a sending terminal. In addition, a record list creating block automatically creates a record list for the non-recorded CM material. The record list is displayed on a recording terminal. These operations are performed for all CM materials included in the list.

15 Claims, 8 Drawing Sheets

*Fig. 2*

* * * * * RECORD LIST * * * * *

TUE - 12/25/90
12:00:00

| No. | MATERIAL ID | MATERIAL LENGTH | MATERIAL TITLE | STATUS |
|---|---|---|---|---|
| START | | MM:SS:FF | SPONSOR NAME | |
| 1 | CMAPS102 | 00:30:00 | XXXX:PROFEEL | OK |
| 2 | CMAPS103 | 00:15:00 | XXXX:*****CAM45 | OK |
| 3 | CMAPS104 | 00:30:00 | XXXX:VIDEO ******* | OK |
| 4 | CMAPS105 | 00:30:00 | XXXX:DISC**** D-66 | OK |
| 5 | CMAPS106 | 00:30:00 | XXXX:NEWS NWS-1856 | OK |
| 6 | CMAPS107 | 00:15:00 | XXXX:LAS ***-10005 | OK |
| END | | | | |

*Fig. 3*

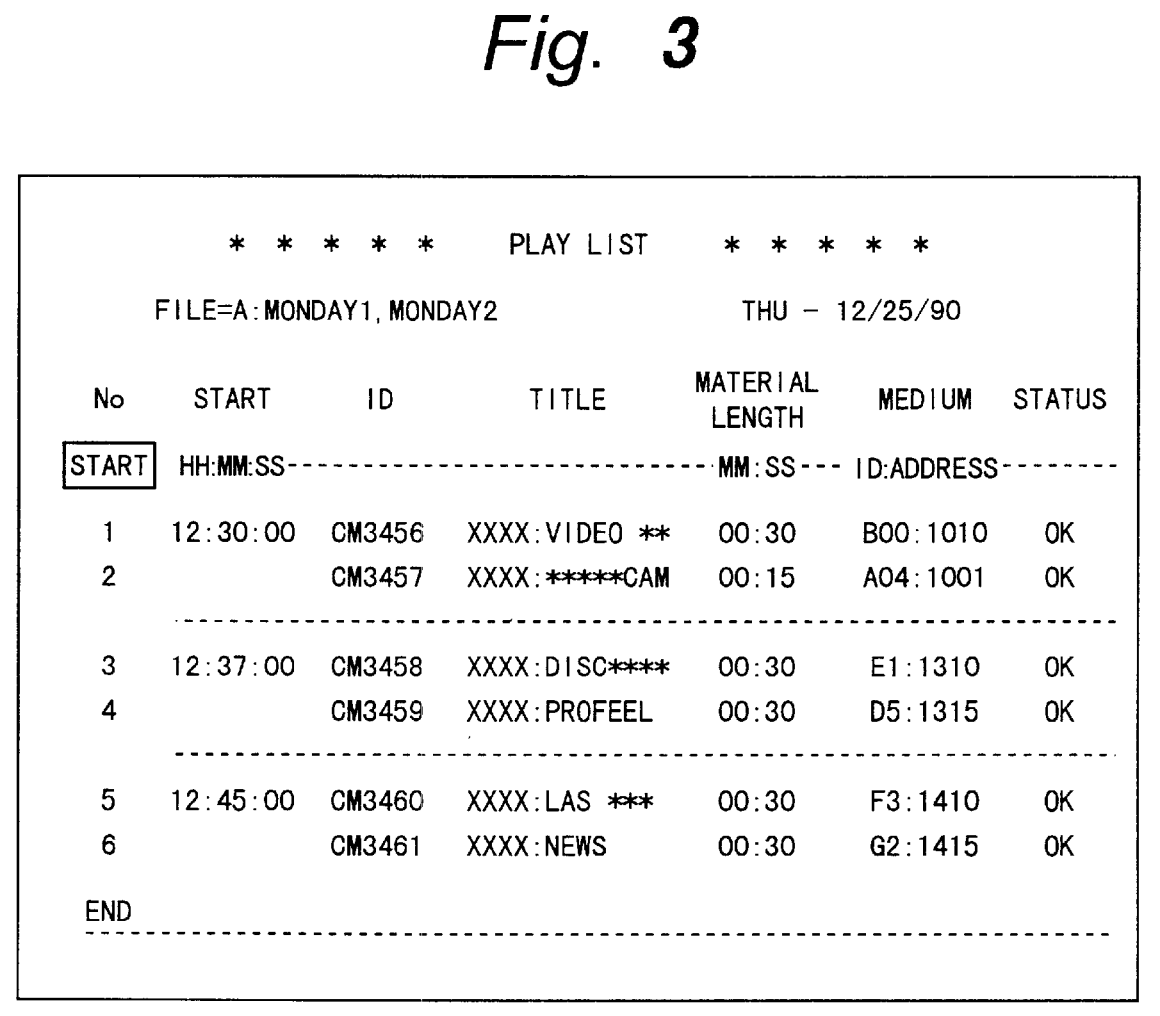

* * * * * PLAY LIST * * * * *

FILE=A:MONDAY1, MONDAY2 THU – 12/25/90

| No | START | ID | TITLE | MATERIAL LENGTH | MEDIUM | STATUS |
|---|---|---|---|---|---|---|
| START | HH:MM:SS | | | MM:SS | ID:ADDRESS | |
| 1 | 12:30:00 | CM3456 | XXXX:VIDEO ** | 00:30 | B00:1010 | OK |
| 2 | | CM3457 | XXXX:*****CAM | 00:15 | A04:1001 | OK |
| 3 | 12:37:00 | CM3458 | XXXX:DISC**** | 00:30 | E1:1310 | OK |
| 4 | | CM3459 | XXXX:PROFEEL | 00:30 | D5:1315 | OK |
| 5 | 12:45:00 | CM3460 | XXXX:LAS *** | 00:30 | F3:1410 | OK |
| 6 | | CM3461 | XXXX:NEWS | 00:30 | G2:1415 | OK |
| END | | | | | | |

*Fig. 5*

* * * * * RECORD LIST * * * * *

TUE - 12/25/90
12:00:00

| No. | MATERIAL ID | MATERIAL LENGTH | MATERIAL TITLE | STATUS |
|---|---|---|---|---|
| START | | MM:SS:FF | SPONSOR NAME | |
| 1 | CMAPS102 | 00:30:00 | XXXX:PROFEEL | OK |
| 2 | CMAPD103 | 00:15:00 | XXXX:*****CAM45 | OK |
| 3 | CMAPS104 | 00:30:00 | XXXX:VIDEO ******* | OK |
| 4 | CMAPD105 | 00:30:00 | XXXX:DISC**** D-66 | OK |
| 5 | CMAPD106 | 00:30:00 | XXXX:NEWS NWS-1856 | OK |
| 6 | CMAPS107 | 00:15:00 | XXXX:LAS ***-10005 | OK |
| * | CM345681 | ——— | ——— | NO (FROM PLAY LIST) |
| END | | | | |

*Fig. 7*

* * * * * RECORD LIST * * * * *

TUE - 12/25/90
12:00:00

| No. | MATERIAL ID | MATERIAL LENGTH | MATERIAL TITLE | STATUS |
|---|---|---|---|---|
| START | | MM:SS:FF | SPONSOR NAME | |
| 1 | CMAPS102 | 00:30:00 | XXXX:PROFEEL | OK |
| 2 | CMAPS103 | 00:15:00 | XXXX:*****CAM45 | OK |
| 3 | CMAPS104 | 00:30:00 | XXXX:VIDEO ******* | OK |
| 4 | CMAPS105 | 00:30:00 | XXXX:DISC**** D-66 | OK |
| 5 | CMAPS106 | 00:30:00 | XXXX:NEWS NWS-1856 | OK |
| 6 | CMAPS107 | 00:15:00 | XXXX:LAS ***-10005 | OK |
| END | | | | |

COMMERCIAL BROADCASTING SYSTEM

BACKGROUND OF THE INVENTION

1. Field of the Invention

The present invention relates to a commercial sending system for automatically creating a record list of commercial materials to be broadcast from a broadcasting station.

2. Description of the Related Art

FIG. 8 shows an example of a commercial sending system using a VCR. Next, with reference to FIG. 8, the commercial sending system will be described.

For example, the commercial sending system shown in FIG. 8 is composed of a recording side host computer 307 (that is referred to as APC (Auto Program Controller)), a sending side host computer 311, a recording side controller 309, a commercial material storing portion 313, and a sending side controller 312. The recording side controller 309 reproduces a commercial material from a commercial material reproducing unit 306 corresponding to a send list (referred to as a play list) created with the recording side host computer 307 by a recording operator 314 or automatically created by the recording side host computer 307. The commercial material storing portion 313 stores the commercial material reproduced from the commercial material reproducing unit 306. The sending side controller 312 controls the commercial material storing portion 313 corresponding to a command received from the sending side host computer 311.

A line connecting the recording side host computer 307 and the recording side controller 309 and a line connecting the sending side host computer 311 and the sending side controller 312 represent passes through which the above-described play list is sent. Reference numeral 308 is a flexible disk that stores a play list created by the recording side host computer 307. When the flexible disk 308 is used, the recording side controller 309 has a reading portion (not shown) that reads play list information recorded on the flexible disk 308. Reference numeral 310 is a video tape cassette.

In such a commercial sending system that sends a commercial, the commercial material reproducing unit 306 and the CM material storing portion 313 may be for example an AV server or a cassette auto-change system that can record and reproduce many materials to be sent.

When a play list is directly supplied from the recording side host computer 307 to the recording side controller 309 or when a play list stored on the flexible disk 308 is loaded to the recording side controller 309, the recording side controller 309 detects the start position of the video tape cassette 310 and then places the commercial material reproducing unit 306 in the standby state (for example, pause state).

When a commercial material included in the play list has been recorded on the video tape cassette 310 loaded in the commercial material reproducing unit 306, a recording operator 314 operates the recording side host computer 307 so as to supply a reproduction command control signal from the recording host computer 307 to the recording side controller 309. The recording side controller 309 reproduces the commercial material from the video tape cassette 310 loaded in the commercial material reproducing unit 306 and supplies the commercial material to the commercial material storing portion 313.

At predetermined sending time, the sending operator 315 operates the sending side host computer 311 so as to supply a sending start control signal from the sending side host computer 311 to the sending side controller 312. Thus, the commercial material stored in the commercial storing portion 313 is aired.

However, in the conventional commercial sending system, when a commercial material included in the play list has not been recorded in the system, a status that represents that the commercial material included in the play list has not been recorded is sent to the sending side host computer 311. Thus, only the sending operator knows the state that the commercial material has not been recorded. The sending operator 315 asks the recording operator 314 to record the commercial material so that it is aired on time.

Thus, since the sending operator 314 should also monitor the recording state of commercial materials, he or she cannot devote himself or herself to the sending operation.

In addition, since the sending operator 315 should directly contact the recording operator 314, there are probabilities of which the sending operator 315 forgets to inform or incorrectly informs him or her of it.

Moreover, when the recording operator 314 receives a recording request, he or she should create a record list for recording the commercial material in the system or operates the recording side host computer 307 to load the commercial material. Thus, after the recording operator 314 receives the recording request for the non-recorded commercial material, the recording operator 314 should create the record list. Consequently, in such a case, the sending operator 315 and the recording operator 314 should perform very troublesome operations.

OBJECTS AND SUMMARY OF THE INVENTION

Therefore, an object of the present invention is to provide a commercial sending system that can easily record a commercial material that has not been recorded.

To solve the above-described problems, a first aspect of the present invention is a commercial sending system for sending a commercial from a broadcasting station, the system comprising a commercial material recording/storing means for recording and storing a commercial material, a record list storing means for storing a record list including record information of the commercial material stored in the commercial material recording/storing means, a send list storing means for storing a send list including send information of the commercial material sent from the commercial material recording/storing means, a commercial material database composed of storage information of the commercial material stored in the commercial material recording/storing means, a detecting means for comparing the send list stored in the send list storing means and the storage information of the commercial material database and detecting a non-recorded commercial material that is included in the send list and that is not included in the storage information, and a record list creating means for automatically creating the record list that includes record information of the non-recorded commercial material to be stored in the commercial material recording/storing means when the detecting means has detected the non-recorded commercial material.

To solve the above-described problems, a second aspect of the present invention is a commercial sending system for sending a commercial from a broadcasting station, the system comprising a commercial material recording/storing means for recording and storing a commercial material, a record list storing means for storing a record list including record information of the commercial material stored in the commercial material recording/storing means, a send list storing means for storing a send list including send information of the commercial material sent from the commercial material recording/storing means, a send list managing means for managing the send list stored in the send list storing means, a commercial material database composed of storage information of the commercial material stored in the commercial material recording/storing means, a commercial material database managing means for managing the storage information stored in the commercial material database, and an automatic record list creating means for automatically creating the record list including the record information of the non-recorded commercial material when a command signal that references the commercial material stored in the commercial material recording/storing means has been supplied from the send list managing means to the commercial material database managing means and the commercial material database managing means has detected the non-recorded commercial material that is included in the send list and that is not included in the commercial material database.

To solve the above-described problems, a third aspect of the present invention is a commercial sending method for sending a commercial from a broadcasting station, the method comprising the steps of (1) recording and storing a commercial material in a commercial material recording/storing means, (2) storing a record list including record information of the commercial material to be stored in the commercial material recording/storing means to a record list storing means, (3) storing a send list including send information of the commercial material to be sent from the commercial material recording/storing means in a send list storing means, (4) comparing a commercial material database composed of storage information of the commercial material stored in the commercial material recording/storing means with the send list and detecting a non-recorded commercial material that is included in the send list and that is not included in the storage information, and (5) automatically creating the record list including the record information of the non-recorded commercial material when the non-recorded commercial material has been detected at the step (4).

To solve the above-described problems, a fourth aspect of the present invention is a commercial sending method for sending a commercial from a broadcasting station, the method comprising the steps of (1) recording and storing a commercial material in a commercial material recording/storing means, (2) storing a record list including record information of the commercial material to be stored in the commercial material recording/storing means to a record list storing means, (3) storing a send list including send information of the commercial material to be sent from the commercial material recording/storing means in a send list storing means, (4) supplying a command signal for referencing the commercial material stored in the commercial material recording/storing means from a send list managing means for managing the send list stored in the send list managing means to a commercial material database managing means for managing a commercial material database composed of storage information of the commercial material stored in the commercial material recording/storing means and causing the commercial material database managing means to detect a non-recorded commercial material that is included in the send list and that is not included in the commercial material database, and (5) automatically creating the record list including the record information of the non-recorded commercial material when the non-recorded commercial material has been detected at the step (4).

As described above, according to the present invention, the send list and the commercial material database are compared. When there is a commercial material that is included in the send list, but not included in the commercial material database, a record list for recording the non-recorded commercial material is automatically created. Thus, a commercial material that has not been recorded can be easily recorded.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 2 is a schematic diagram showing an example of a record list displayed on a recording operation terminal;

FIG. 3 is a schematic diagram showing an example of a play list displayed on a sending operation terminal;

FIG. 5 is a schematic diagram showing an example of a record list including non-recorded commercial information displayed on the recording operation terminal;

FIG. 7 is a schematic diagram showing an example of a record list displayed on the recording operation terminal in the case that a non-recorded commercial material is automatically added to the record list.

DETAILED DESCRIPTION OF THE PREFERRED EMBODIMENTS

Next, an embodiment of the present invention will be described. In a commercial sending system according to the present invention, when a commercial material included in a commercial material send list (referred to as a play list) has not been recorded in the system, information representing that the material has not been recorded is displayed on a recording operation terminal. In addition, a record list for the non-recorded commercial material is automatically created.

Figure 1:
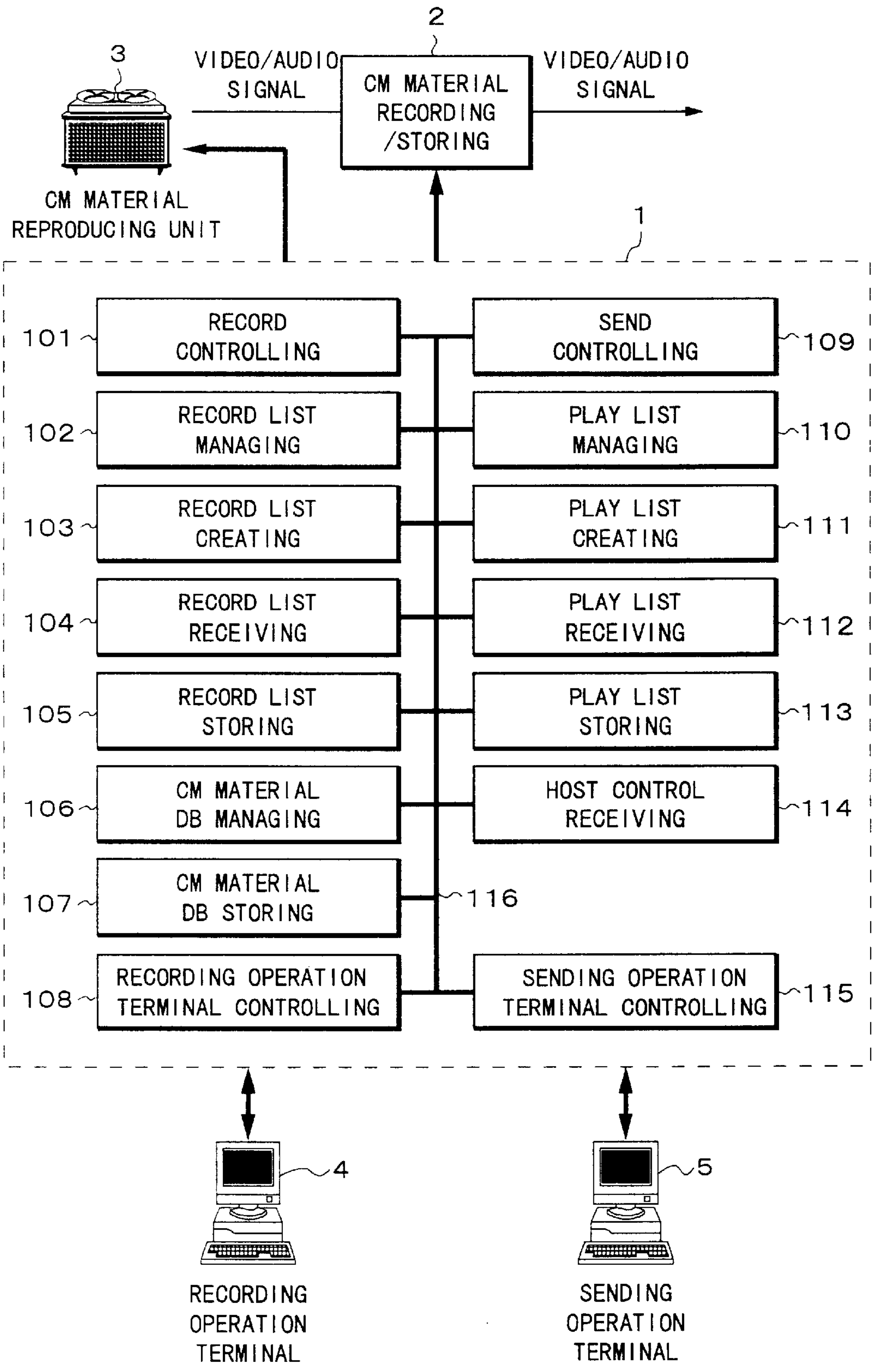
FIG. 1 is a schematic diagram showing an example of the system structure according to an embodiment of the present invention.

FIG. 1 is a schema tic diagram showing an example of the structure of a commercial sending system according to an embodiment of the present invention. This system is composed of a control computer system 1, a commercial (hereinafter abbreviated as CM) material recording/storing unit 2, a CM material reproducing unit 3, a recording operation terminal 4, and a sending operation terminal 5.

The CM material recording/storing unit 2 records, stores, and reproduces many CM materials. The CM material recording/storing unit 2 is for example a large-scaled cassette auto-changer system or an AV server. Examples of the record medium for CM materials are a video tape, an MO (Magnet Optical disk), and a hard disk. The CM material recording/storing unit 2 is controlled corresponding to commands received from the control computer system 1.

The CM material reproducing unit 3 reproduces a CM material brought from the outside. An example of the CM material reproducing unit 3 is a video cassette recorder (VCR). As with the CM material recording/reproducing unit 2, the CM material reproducing unit 3 is controlled corresponding to commands received from the control computer system 1.

The recording operation terminal 4 and the sending operation terminal 5 each have input devices (such as a keyboard and a mouse) and display units (such as a CRT). The recording operation terminal 4 and the sending operation terminal 5 are operated by operators. The terminals 4 and 5 may be conventional personal computers or non-intelligent terminal units (that do not have CPUs).

The control computer system 1 is composed of a record controlling block 101, a record list managing block 102, a record list creating block 103, a record list receiving block 104, a record list storing block 105, a recording operation terminal controlling block 108, a CM material database managing block 106, a CM database storing block 107, a send controlling block 109, a play list managing block 110, a play list creating block 111, a play list receiving block 112, a play list storing block 113, a host control receiving block 114, and a sending operation terminal controlling block 115. These blocks exchange data and control commands through a control bus 116.

The record controlling block 101 controls the CM material recording/storing unit 2 and the CM material reproducing unit 3.

The control computer system 1 may be connected to a host computer system (such as a data management computer) or a computer network (not shown). In this case, the host computer system sends a control command such as a play (reproduction) command for the CM material recording/storing unit 2 to the host control receiving block 114. The host control receiving block 114 performs a predetermined process. In this example, the host control receiving block 114 sends a command to the CM material recording/storing unit 2.

The recording operation terminal controlling block 108 and the sending operation controlling block 115 control the recording operation terminal 4 and the sending operation terminal 5, respectively. In other words, the recording operation terminal controlling block 108 and the sending operation terminal controlling block 115 process messages sent from the control computer system 1 to the operators. The resultant data is sent to the recording operation terminal 4 and the sending operation terminal 5 and then displayed on their display units. On the other hand, messages that are input from the recording operation terminal 4 and the sending operation terminal 5 by the operators is sent to the recording operation terminal controlling block 108 and the sending operation terminal controlling block 115. The recording operation terminal controlling block 108 and the sending operation terminal controlling block 115 process the input messages and send the resultant data to the control computer system 1.

The record list managing block 102, the record list creating block 103, the record list receiving block 104, and the record list storing block 105 process a record list that is a working list that is supplied to the CM material recording/storing unit 2. The record list includes information of CM materials to be recorded as shown in FIG. 2. The record list has fields of information of source materials to be recorded (such as a material ID field, a material name field, a material length field, a CM sponsor name field, and a CM use period field). The material ID field has material IDs that are unique for CM materials stored in the CM material recording/storing unit 2 so as to identify many CM materials.

The record list creating block 103 creates a record list through an operation of for example the recording operation terminal 4. The record list receiving block 104 receives a record list from the host computer system or the like. The record list storing block 105 stores the created/received record list. The record list managing block 102 manages the record list stored in the record list storing block 105.

The CM material database management block 106 and the CM material database storing block 107 compose a database of CM material information. The database has fields of information of source materials included in the record list and storage information of CM materials stored in the CM material recording/storing unit 2.

In other words, the fields of the database include the fields of the record list, a record medium ID field for identifying record mediums that record materials, an address field (that has addresses of materials on the record medium), a check (review) flag field (this flag represents whether or not a material that has been recorded can be sent, and a completion flag field (this flag represents that a material has been recorded in the CM material recording/storing unit 2).

When the CM material database managing block 106 references the CM material database storing block 107, the block 106 can detect CM materials stored in the CM material recording/storing unit 2.

The record controlling block 101 controls the recording operation of a CM material corresponding to the record list. In other words, predetermined commands are exchanged among the CM material reproducing unit 3, the CM material recording/storing unit 2, and the record controlling block 101. Thus, the CM material reproducing unit 3 reproduces a material corresponding to the contents of the record list. In addition, the CM material recording/storing unit 2 records a material reproduced from the CM material reproducing unit 3.

When a CM material is recorded, the completion flag of the CM material database has a value representing that the material has been recorded.

The play list managing block 110, the play list creating block 111, the play list receiving block 112, and the play list storing block 113 perform processes for a play list for sending a CM material. The play list includes information of CM materials to be sent as shown in FIG. 3. In other words, the play list has such as an CM material ID field, a send start time field, a material name field, an event name field (that has an event name as a unit of a program in the broadcasting station), a CM material length field, a record medium ID field (that has IDs of record mediums on which CM materials are recorded), and an address field (that has addresses of CM materials on record mediums).

The play list creating block 111 creates a play list through an operation of for example the sending operation terminal 5. The play list receiving block 112 receives a play list from the host computer system or the like. The play list storing block 113 stores a created/received play list. The play list managing block 110 manages the play list stored in the play list storing block 113.

The send controlling block 109 controls the sending operation of a CM material corresponding to the play list. In other words, predetermined commands are exchanged between the send controlling block 109 and the CM material recording/storing unit 2. Thus, the send controlling block 109 obtains a desired CM material from many CM materials recorded in the system corresponding to the play list and sends the obtained CM material at send start time assigned in the play list.

The control computer system 1 may be composed of one computer or a plurality of computers. When the control computer system 1 is composed of a plurality of computers, the blocks that compose the control computer system 1 are properly distributed to the computers. In addition, a computer network is used as a part of the control bus 116.

In the CM sending system, the recording operator operates the recording operation terminal 4 so as to record a CM material. The CM material reproducing unit 3 successively reproduces many CM materials brought from the outside and sends their video/audio signals to the CM material recording/storing unit 2. After the recording operation is performed, the sending operator 4 operates the sending operation terminal 4 so as to send a CM material stored in the CM material storing unit 2 corresponding to the play list.

Next, the CM material recording operation will be described in detail. When the CM material recording operation is performed, the operator prepares a record list that is a working list for obtaining CM materials. A record list is created by the operator on the recording operation terminal 4. Alternatively, a record list is received from a host computer such as a data management computer. The created/received record list is supplied to the control computer system 1.

When the record list is created by the operator, the recording operation terminal controlling block 108 controls the recording operation terminal 4 so as to supply a command that is input by the operator from the recording operation terminal 4 to the record list creating block 103. The record list creating block 103 performs the record list creating process corresponding to the command received from the recording operation terminal 4. The record list managing block 102 stores the created record list in the record list storing block 105.

When a record list is received from the host computer, the record list receiving block 104 performs the receiving process of the record list. The record list managing block 102 stores the resultant record list in the record list storing block 105.

When the record list is supplied to the control computer system 1 and stored in the record list storing block 105, the operator performs the recording operation for a CM material. At this point, the operator causes the record list managing block 102 to obtain the record list. The record list managing block 102 obtains the record list from the record list storing block 105 corresponding to the command issued by the operator. The record controlling block 101 controls the recording operation corresponding to the obtained record list.

After the recording operation is completed, the CM material database managing block 106 stores information of CM material in the CM material database storing block 107. In addition, the CM material database managing block 106 sets the predetermined flag that represents that the CM material has been recorded.

Next, the CM material sending operation will be described in detail. When the CM material sending operation is performed, the operator prepares a play list that is a working list for sending a CM material. The operator creates a play list on the sending operation terminal 5. Alternatively, a play list is received from a host computer such as a data management computer. The created/received play list is supplied to the control computer system 1.

When the operator creates a play list, the sending operation terminal controlling block 115 controls the sending operation terminal 5. The operator inputs a command to the sending operation terminal 5. The command is sent to the play list creating block 111. The play list creating block 111 creates a play list corresponding to the command issued by the operator. The play list managing block 110 stores the created play list in the play list storing block 113.

When a play list is received from the host computer, the play list receiving block 112 receives the play list. The play list managing block 110 stores the play list in the play list storing block 113.

When the play list is supplied to the control computer system 1 and stored in the play list storing block 110, it is determined whether or not a CM material included in the play list has been stored in the system. In other words, the play list managing block 110 causes the CM material database managing block 106 to determine whether or not the CM material has been stored in the CM material database storing block 107.

When the CM material has been recorded in the system, the CM material is sent corresponding to the play list. The play list managing block 110 obtains the play list from the play list storing block 113. The send controlling block 109 controls the sending operation corresponding to the obtained play list.

The sending operation is performed when the operator inputs a command for the sending operation to the sending operation terminal 5. Alternatively, when a control command is received from the host computer to the host control receiving block 114, the sending operation is performed.

Figure 4:
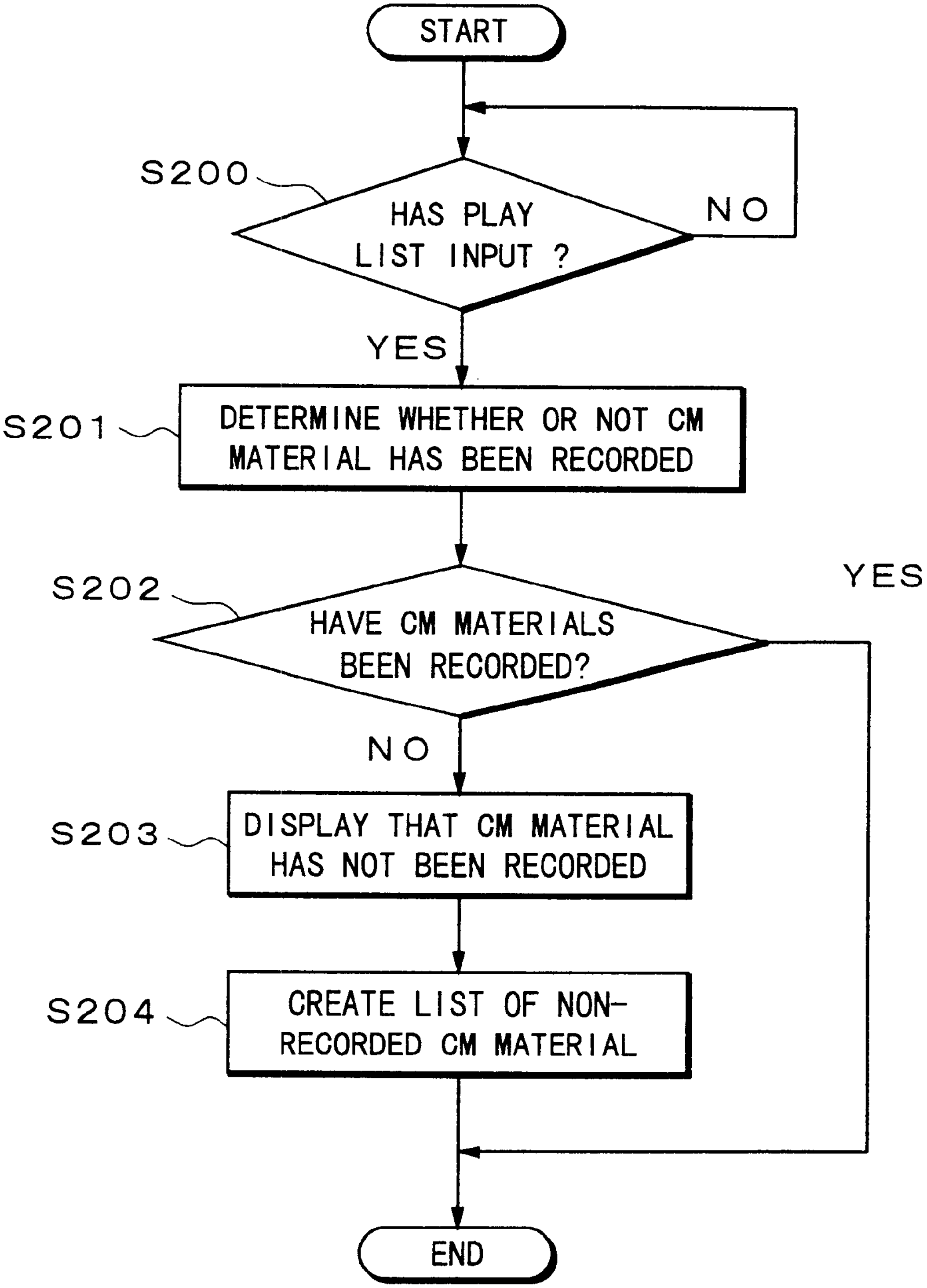
FIG. 4 is a flow chart showing an operation for checking whether or not a commercial material included in the play list has been recorded in the system.

Next, with reference to FIG. 4, the process for determining whether or not a CM material included in the play list has been recorded in the system will be described. FIG. 4 is a flow chart showing such a process.

At step S200, it is determined whether or not a play list has been created by the operator or received from the host computer. The step S200 continues until a play list is input.

When the determined result at step S200 is YES (namely, the play list has been input), the flow advances to step S201. At step S201, the play list managing block 110 causes the CM material database managing block 106 to determine whether or not each of CM materials included in the play list has been recorded.

The CM material database managing block 106 obtains contents of the request received from the play list managing block from database information stored in the CM material management database storing block 107.

When the play list that is input at step S200 includes five CM materials to be sent, the play list managing block 110 causes the CM material database managing block 106 to determine whether or not a first CM material has been recorded. The CM material database managing block 106 determines the CM material information stored in the CM material database recording block 107. The CM material database managing block 106 sends the result to the play list managing block 110.

Thereafter, the flow advances to step S202. At step S202, the play list managing block 110 determines whether or not the assigned CM material (in this case, the first CM material) included in the play list has been recorded corresponding to the result received from the CM material database managing block 106.

At step S202, when the assigned CM material has been recorded, the process is completed.

On the other hand, when the determined result at step S202 is NO (namely, the assigned CM material has not been recorded), the flow advances to step S203. At step S203, the play list managing portion 110 sends data that represent that the assigned CM material has not been recorded and information that identifies the CM material for example the ID or name thereof to the recording operation terminal controlling block 108. Thus, the recording operation terminal controlling block 108 displays data that represents that the assigned CM material has not been recorded and the ID information thereof on the recording operation terminal 4 as shown in FIG. 5. Thus, the recording operator can know that the assigned CM material has not been recorded.

Figure 6:
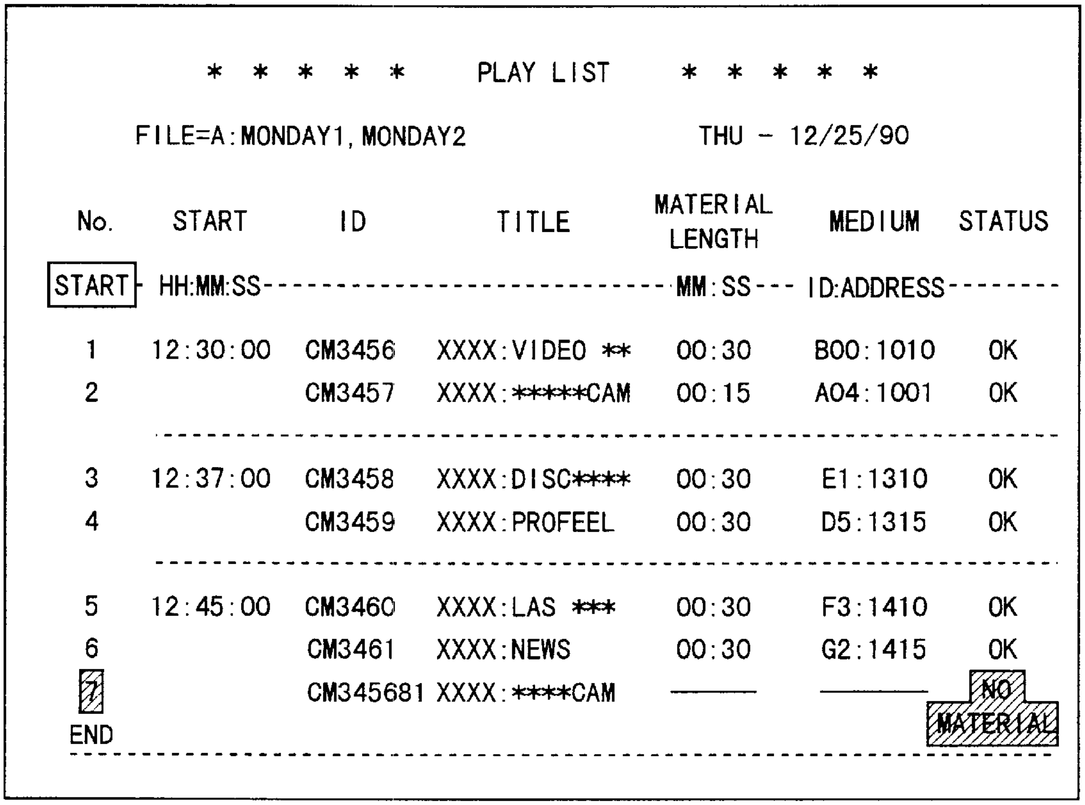
FIG. 6 is a schematic diagram showing an example of a play list with a mark representing a non-recording state displayed on the sending operation terminal.
Figure 8:
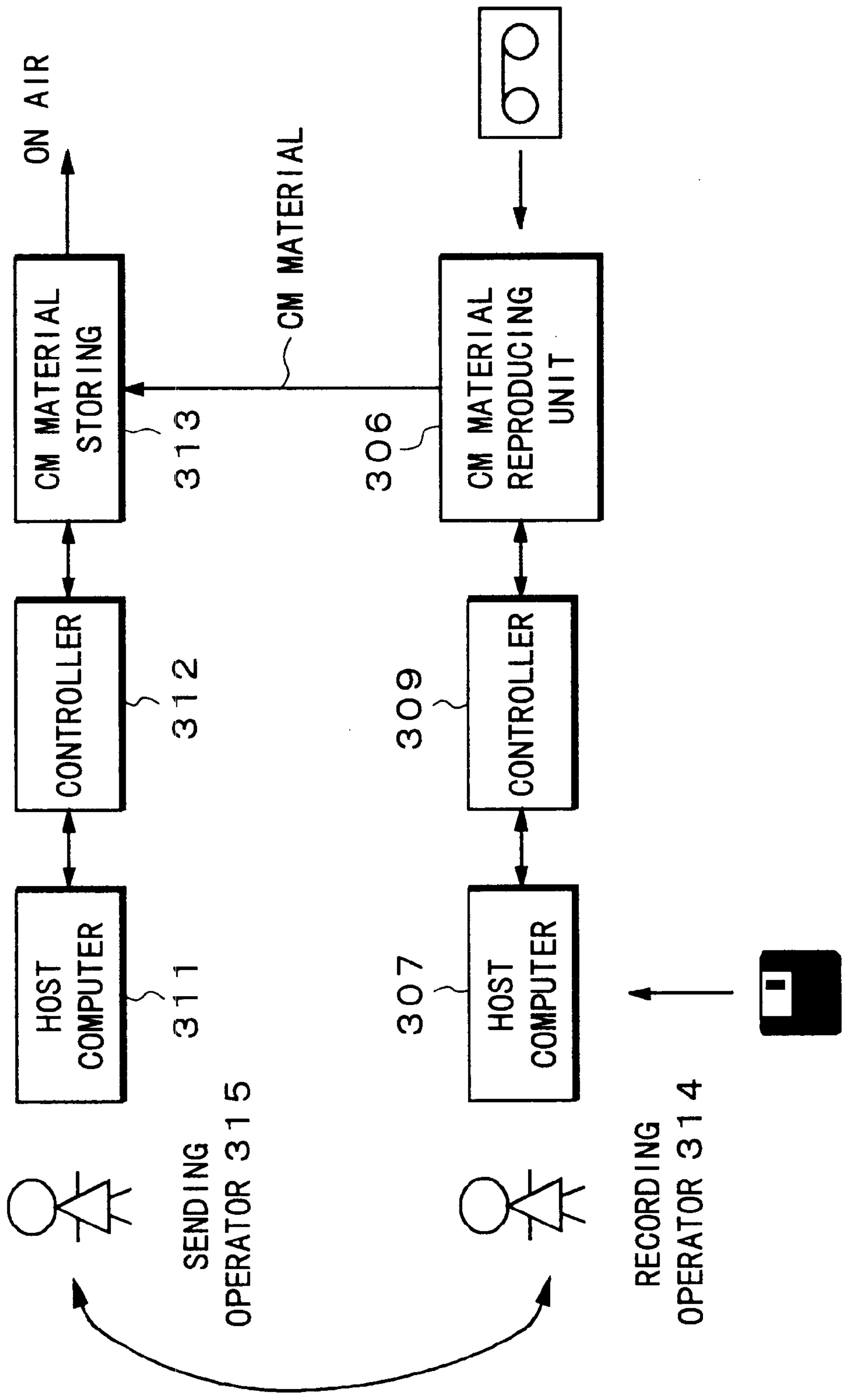
FIG. 8 is a schematic diagram showing an example of a structure of a conventional commercial sending system.

In addition, at step S203, a mark that represents that the assigned CM message has not been recorded is placed to the CM material field of the assigned CM material in the play list as shown in FIG. 6. The play list is supplied to the sending operation terminal controlling block 115. The sending operation terminal controlling block 115 displays the play list on the sending operation terminal 5. At this point, an un-record mark is placed for the un-recorded CM material. Thus, the sending operator can know that there is an un-recorded CM material.

Thereafter, the flow advances to step S204. At step S204, the play list managing block 110 sends the CM material information of the play list to the record list creating block 103 so as to create a record list of the non-recorded CM material. The record list creating block creates a record list for the non-recorded CM material as shown in FIG. 7.

In this example, the record list is newly created because the record list includes the first non-recorded CM material. When the play list has included a non-recorded CM material, another non-recorded CM material is added to the record list.

At step S204, when all CM materials included in the play list have been checked, the process shown in FIG. 4 is completed.

At step S204, when a CM material included in the play list has not been checked, the flow returns to step S201. At step S201, the next CM material included in the play list is checked.

As described above, according to the present invention, when a CM material included in a play list has not been recorded, the recording operator is automatically informed of this situation. In addition, a record list for the non-recorded CM material is automatically created. Thus, since the sending operator does not need to monitor the recording state of CM materials, he or she can devote himself or herself to the sending operation.

In addition, since a non-recorded CM material is automatically displayed on the recording operation terminal, the recording operator can obtain information of the non-recorded CM material without necessity of a contact of the sending operator to the recording operator. Thus, negligence and mistake of operators can be prevented.

Moreover, since a record list for a non-recorded CM material is automatically created, the recording operator does not need to prepare it. Thus, the recording operator can directly perform the recording operation.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A commercial sending system for sending a commercial from a broadcasting station, the system comprising:

commercial material recording/storing means for recording and storing a commercial material;

recording list storing means for storing a recording list including record information of the commercial material to be stored in said commercial material recording/storing means;

send list storing means for storing a send list including send information of the commercial material to be sent from said commercial material recording/storing means;

a commercial material database composed of storage information of the commercial material stored in said commercial material recording/storing means;

detecting means for comparing the send list stored means and the storage information of said commercial material database and for detecting a non-recording commercial material that is included in the send list and that is not included in the storage information;

recorded list creating means for adding the recording information of the non-recording commercial material to the record list so as to automatically create a new record list when said detecting means has detected the non-recorded commercial material, said new record list containing the record information of the commercial material to be stored in said commercial material recording/storing means and further containing the record information of the non-recorded commercial material;

record list displaying means for displaying the record list stored in said recording list storing means; and send list displaying means for displaying the send list stored in said send list storing means, wherein a signal that defines the non-recorded commercial material is sent to said record list displaying means and said send list displaying means, and information that represents the non-recording commercial material is displayed on said record list displaying means and said send list displaying means when said detecting means has detected the non-recorded commercial material.

2. The commercial sending system as set forth in claim 1, further comprising:

send list receiving means connected to a host system and adapted for receiving a send list from the host system, wherein the received send list is stored in said send list storing means.

3. The commercial sending system as set forth in claim 1, wherein the commercial material database is composed of the storage information of the commercial material stored in said commercial material recording/storing means and the record information of the commercial material included in the record list.

4. A commercial sending system for sending a commercial from a broadcasting station, the system comprising:

commercial material recording/storing means for recording and storing a commercial material;

record list storing means for storing a record list including record information of the commercial material to be stored in said commercial material recording/storing means;

send list storing mans for storing a send list including send information of the commercial material to be sent from said commercial material recording/storing means;

send list managing means for managing the send list stored in said send list storing means;

a commercial material database composed of storage information of the commercial material stored in said commercial material recording/storing means;

commercial material database managing mans for managing the storage information stored in said commercial material database;

automatic record list creating means for automatically creating the record list including the record information of the non-recorded commercial material when a command signal that references the commercial material to be stored in said commercial in said commercial material recording/storing means has been supplied from said send list managing means to said commercial material database managing means and said commercial material database managing means has detected the non-recorded commercial material that is included in the send list and that is not included in said commercial material database, said record list creating means adding the record information of the non-recorded commercial material to the record list so as to create a new record list when said commercial material database managing means has detected the non-recorded commercial material database, said new record list containing the record information of the commercial material stored in said commercial material recording/storing means and further containing the record information of the non-recorded commercial material;

record list displaying means for displaying the record list stored in said record list storing means; and send list displaying means for displaying the send list stored in said send list storing means, wherein a signal that defines the non-recorded commercial material is sent to said record list displaying means and said send list displaying means, and information that represents the non-recorded commercial materials is displayed on said record list displaying means and said send list displaying means when said detecting means has detected the non-recorded commercial material.

5. The commercial sending system as set forth in claim 4, wherein said record list creating means is adapted for automatically creating the record list including the record information of the non-recorded commercial material when said record list managing means has input a command signal that references the commercial material stored in said commercial material recording/storing means to said commercial material database managing means, said commercial material database managing means has referenced said commercial material database and has detected the non-recorded commercial material that is included in the send list and not included in said commercial material database, and said commercial material database managing means has detected the non-recorded commercial material.

6. The commercial sending system as set forth in claim 4, wherein the commercial material database is composed of the storage information of the commercial material stored in said commercial material recording/storing means and the record information of the commercial material included in the record list.

7. The commercial sending system as set forth in claim 4, further comprising:

send list receiving means connected to a host system and adapted for receiving a send list from the host system, wherein the received send list is supplied from said send list managing means to said send list storing means.

8. A commercial sending method for sending a commercial from a broadcasting station, the method comprising the steps of:

recording and storing a commercial material;

storing a record list including record information of the commercial material that is to be stored;

storing a send list including send information of the commercial material that is to be sent;

comparing a commercial material database composed of storage information of the stored commercial material and the send list;

detecting a non-recorded commercial material that is included in the send list and that is not included in the storage information;

adding the record information of the non-recorded commercial material to the record list so as to automatically create a new record list when the non-recorded commercial material has been detected, said new record list containing the record information of the commercial material that is to be stored and further containing the record information of the non-recorded commercial material; and supplying a signal that defines the non-recorded commercial material, and displaying information that represents the non-recorded commercial material on record list displaying means for displaying the record list and on send list displaying means for displaying the send list when the non-recorded commercial material has been detected.

9. The commercial sending method as set forth in claim 8, further comprising displaying the record list including the record information of the non-recorded commercial material when the non-recorded commercial material has been detected.

10. The commercial sending method as set forth in claim 8, wherein the storing step includes receiving the send list sent from a host system and storing the received send list storing means.

11. The commercial sending method as set forth in claim 8, wherein the commercial material database is composed of the storage information of the stored commercial material and record information of the commercial material included in the record list.

12. A commercial sending method for sending a commercial from a broadcasting station, the method comprising the steps of:

recording and storing a commercial material;

storing a record list including record information of the commercial material that is to be stored;

storing a send list including send information of the commercial material that is to be sent;

supplying a command signal for referencing the stored commercial material to commercial material database managing means for managing a commercial material database composed of storage information of the commercial material;

detecting a non-recorded commercial material that is included in the send list and that is not included in the storage information;

adding the record information of the non-recorded commercial material to the record list so as to automatically create a new record list when the non-recorded commercial material has been detected, said new record list containing the record information of the commercial material that is to be stored and further containing the record information of the non-recorded commercial material; and supplying a signal that defines the non-recorded commercial material, and displaying information that represents the non-recorded commercial material on record list displaying means for displaying the record list and on send list displaying means for displaying the send list when the non-recorded commercial material has been detected.

13. The commercial sending method as set forth in claim 12, further comprising displaying the record list including the record information of the non-recorded commercial material when the non-recorded commercial material has been detected.

14. The commercial sending method as set forth in claim 12, wherein the storing step includes receiving the send list sent from a host system and storing the received send list.

15. The commercial sending method as set forth in claim 12, wherein the commercial material database is composed of the storage information of the stored commercial material and record information of the commercial material included in the record list.

* * * * *